(12) United States Patent
Blech et al.

(10) Patent No.: US 6,894,822 B2
(45) Date of Patent: May 17, 2005

(54) ROBUST REFLECTIVE SURFACE FOR LIGHT MODULATORS

(75) Inventors: Ilan Blech, Los Altos, CA (US); Chris Gudeman, Los Gatos, CA (US); Omar S. Leung, Palo Alto, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 0 days.

(21) Appl. No.: 10/758,453

(22) Filed: Jan. 15, 2004

(65) Prior Publication Data

US 2004/0150864 A1 Aug. 5, 2004

Related U.S. Application Data

(60) Provisional application No. 60/444,883, filed on Feb. 4, 2003.

(51) Int. Cl.[7] .............................. G02F 1/83; G02F 1/07
(52) U.S. Cl. ....................................... 359/247; 359/291
(58) Field of Search ................................ 359/247, 291, 359/292, 846; 216/24

(56) References Cited

U.S. PATENT DOCUMENTS

| | | | |
|---|---|---|---|
| 5,311,360 A | 5/1994 | Bloom et al. | |
| 5,504,614 A | 4/1996 | Webb et al. | |
| 5,661,592 A | 8/1997 | Bornstein et al. | |
| 5,841,579 A | 11/1998 | Bloom et al. | |
| 5,978,127 A | * 11/1999 | Berg | ........................... 359/279 |
| 6,204,085 B1 | 3/2001 | Strumpell et al. | |
| 6,215,579 B1 | 4/2001 | Bloom et al. | |
| 6,229,650 B1 | 5/2001 | Reznichenko et al. | |
| 6,663,790 B2 | * 12/2003 | Kowarz et al. | ............... 216/24 |

OTHER PUBLICATIONS

Bloom, D.M., et al. "The Grating Light Valve: revolutionizing display technology" 1997, pp. 1–10; Silicon Light Machines, Sunnyvale, California.

AMM, D.T., et al. "Grating Light Valve Technology: Update and Novel Applications" May 19, 1998, pp. 1–4; Presented at Society for Information Display Symposium, Anaheim, California.

AMM, David T., et al. "Optical Performance of the Grating Light Valve Technology" 1999, pp. 1–8; Silicon Light Machines, Sunnyvale, California.

R.W. Corrigan, et al. "Calibration of a Scanned Linear Grating Light Valve Projection System" May 18, 1999, pp. 1–4, Silicon Light Machines. Presented at Society for Information Display Symposium, San Jose, CA.

Agfa Xcalibur 45, Introducing High–Definition Computer–to–Plate (HD–CTP), Product and Technology Overview pp. 1–23, Copyright 2002 by Agfa Corporation.

* cited by examiner

Primary Examiner—Scott J. Sugarman
Assistant Examiner—Richard Hanig
(74) Attorney, Agent, or Firm—Okamoto & Benedicto LLP

(57) ABSTRACT

In one embodiment, a video display system employs an array of ribbon light modulators having a reflective surface configured to reflect or diffract a beam. The beam may have a wavelength suitable for displaying a video image. The reflective surface may comprise an aluminum alloy suitable for receiving the beam, which may have a relatively high power density. In one embodiment, a method of displaying a video image comprises impinging a beam on a portion of a reflective surface of a light modulator. The beam may have a wavelength suitable for displaying a video image, and the reflective surface may comprise an aluminum alloy.

37 Claims, 3 Drawing Sheets

ROBUST REFLECTIVE SURFACE FOR LIGHT MODULATORS

REFERENCE TO RELATED APPLICATION

This application claims the benefit of U.S. Provisional Application No. 60/444,883, filed on Feb. 4, 2003 by Ian Blech, Chris Gudeman, and Omar S. Leung, which is incorporated herein by reference in its entirety.

BACKGROUND OF THE INVENTION

1. Field of the Invention

The present invention relates generally to reflective surfaces, and more particularly but not exclusively to reflective surfaces employed in light modulators.

2. Description of the Background Art

Light modulators fabricated using micro electromechanical system (MEMS) technology, in general, are well known. Examples of such light modulators include the Grating Light Valve™ (GLV™) light modulator available from Silicon Light Machines, Inc., and the digital micro-mirror device available from Texas Instruments, Inc. GLV™ light modulators employ a plurality of ribbons to reflect or diffract incident light. Devices that are of the same type as GLV™ light modulators are hereinafter referred to as "ribbon light modulators". Ribbon light modulators are described in the following disclosures, which are incorporated herein by reference in their entirety: U.S. Pat. No. 5,311,360 to Bloom et al.; U.S. Pat. No. 5,841,579 to Bloom et al.; and U.S. Pat. No. 5,661,592 to Bornstein et al. Ribbon light modulators and micro-mirrors can be employed in various applications including optical networks, manufacturing, data storage, video, and printing. As can be appreciated, it is advantageous to optimize a light modulator for a specific application.

Ribbon light modulators have been employed in printing applications. In one printing application, a laser beam is bounced off a reflective surface of a ribbon light modulator and onto a plate. The laser beam has a wavelength ranging from 800 nm to 830 nm, and a power density of about 2 kW/cm$^2$, which, when focused, is sufficient to expose the plate. The ribbon light modulator is actuated to modulate the laser beam and form a pattern on the plate. The plate is inked and rolled onto paper to transfer the pattern thereon. The Xcalibur 45™ platesetter from the Agfa Corporation employs such a ribbon light modulator. In the just-mentioned printing application, the ribbon light modulator has a reflective surface of aluminum alloy consisting 99.5% aluminum and 0.5% Copper (Al—Cu$_{(0.5\%)}$). The copper in the aluminum alloy is believed to minimize aluminum diffusion, thereby making the ribbon light modulator less susceptible to damage caused by large thermal gradients. The use of a ribbon light modulator in a printing application is also disclosed in U.S. Pat. No. 6,229,650.

SUMMARY

In one embodiment, a video display system employs an array of ribbon light modulators having a reflective surface configured to reflect or diffract a beam. The beam may have a wavelength suitable for displaying a video image. The reflective surface may comprise an aluminum alloy suitable for receiving the beam, which may have a relatively high power density.

In one embodiment, a method of displaying a video image comprises impinging a beam on a portion of a reflective surface of a light modulator. The beam may have a wavelength suitable for displaying a video image, and the reflective surface may comprise an aluminum alloy.

These and other features of the present invention will be readily apparent to persons of ordinary skill in the art upon reading the entirety of this disclosure, which includes the accompanying drawings and claims.

The use of the same reference label in different drawings indicates the same or like components. Drawings are not necessarily to scale unless otherwise noted.

DETAILED DESCRIPTION

In the present disclosure, numerous specific details are provided, such as examples of apparatus, materials, process steps, and structures, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
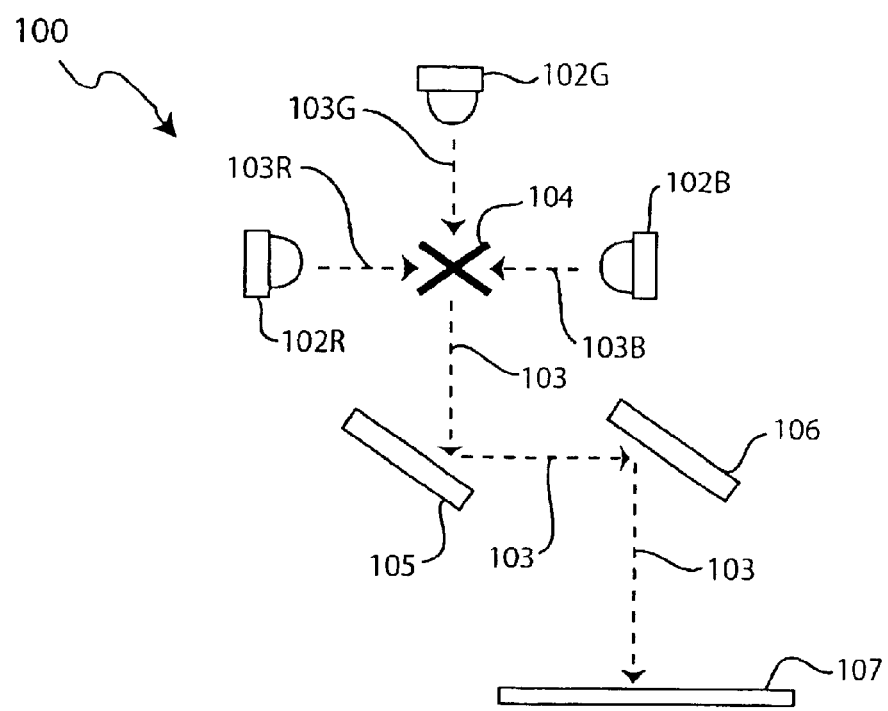
FIG. 1 schematically shows a video display system in accordance with an embodiment of the present invention.

FIG. 1 schematically shows a video display system 100 in accordance with an embodiment of the present invention. System 100 may be similar to those described in U.S. Pat. No. 6,215,579, except for the use of a reflective surface comprising aluminum alloy in the light modulators of a light modulating array 105. U.S. Pat. No. 6,215,579 is incorporated herein by reference in its entirety.

System 100 includes light sources 102 (102R, 102G, 102B), a dichroic filter group 104, light modulating array 105, and a scanning mirror 106. Light sources 102 may be semiconductor lasers for emitting a beam 103 (103R, 103G, 103B) suitable for displaying a video image on a display screen 107. In the example of FIG. 1, light source 102R emits a laser beam 103R having a wavelength of about 632 nm to represent the red color of a multi-color video image; light source 102G emits a laser beam 103G having a wavelength of about 532 nm to represent the green color of the multi-color video image; and light source 102B emits a laser beam 103B having a wavelength of about 430 nm to represent the blue color of the multi-color video image. System 100 may be configured to operate with laser beams having a wavelength below about 800 nm and above about 900 nm, preferably between about 400 nm and about 700 nm.

Dichroic filter group 104 may comprise several dichroic filters for directing a beam 103 onto light modulating array 105. Specifically, a first, a second, and a third dichroic filters in dichroic filter group 104 may be configured to direct beams 102R, 102G, and 102B, respectively, onto light modulating array 105. At any given time, only one of light sources 102 is enabled to emit a beam 103 through dichroic filter group 104. That is, beam 103 between dichroic filter group 104 and light modulating array 105 may be beam 103R, 103G, or 103B depending on the color that is to be projected onto screen 107 at that time. The transmission of a beam 103 through dichroic filter group 104 may be controlled by using synchronized color wheels (not shown) in front of each light source 102, for example. Each color wheel may have one or more windows for allowing a beam 103 to pass through. By synchronizing the rotation of the color wheels, only one beam 103 will pass through dichroic filter group 104 at any given time. Light sources 102 may also be individually enabled and disabled to synchronize the passing of a beam 103 through dichroic filter group 104.

Light modulating array 105, which comprises an array of ribbon light modulators in this embodiment, modulates incident beam 103. Light modulators in light modulating array 105 may be individually controlled to diffract or reflect beam 103, and thereby direct beam 103 towards scanner 106. Scanner 106 may be a moveable, scanning mirror for projecting beam 103 on screen 107. By controlling the transmission of beam 103 through dichroic filter group 104, the actuation of light modulating array 105, and the movement of scanner 106, a multi-color video image may be displayed on screen 107.

As can be appreciated from the foregoing, three light modulating arrays 105 may be employed instead one. In that case, one light modulating array 105 may be employed for each light source 102—a first light modulating array 105 may be employed to diffract or reflect beam 103R, a second light modulating array 105 may be employed to diffract or reflect beam 103G, and so on.

Figure 2:
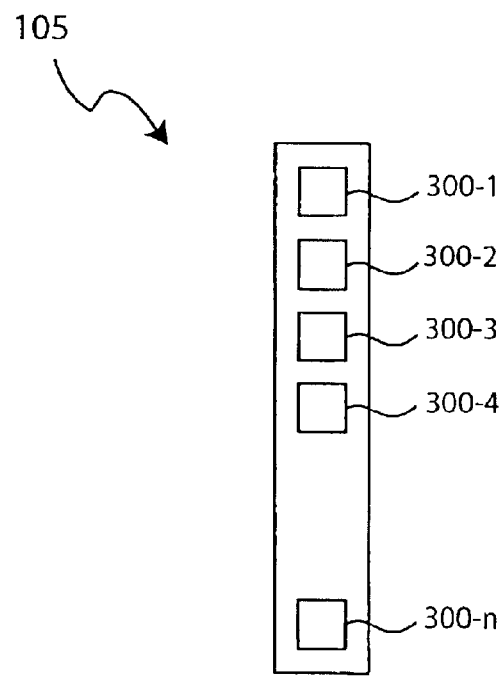
FIG. 2 schematically shows a light modulating array in accordance with an embodiment of the present invention.

FIG. 2 schematically shows a light modulating array 105 in accordance with an embodiment of the present invention. Light modulating array 105 may comprise one or more light modulators 300 (300-1, 300-2, . . . , 300-n). In one embodiment, light modulating array 105 comprises 1080 light modulators 300, with each light modulator representing a single pixel of a video image. Thus, beams 103 impinging on light modulator 105 may be scanned on screen 107 to display a video image having a vertical (or horizontal) resolution of 1080 pixels.

Figure 3A:
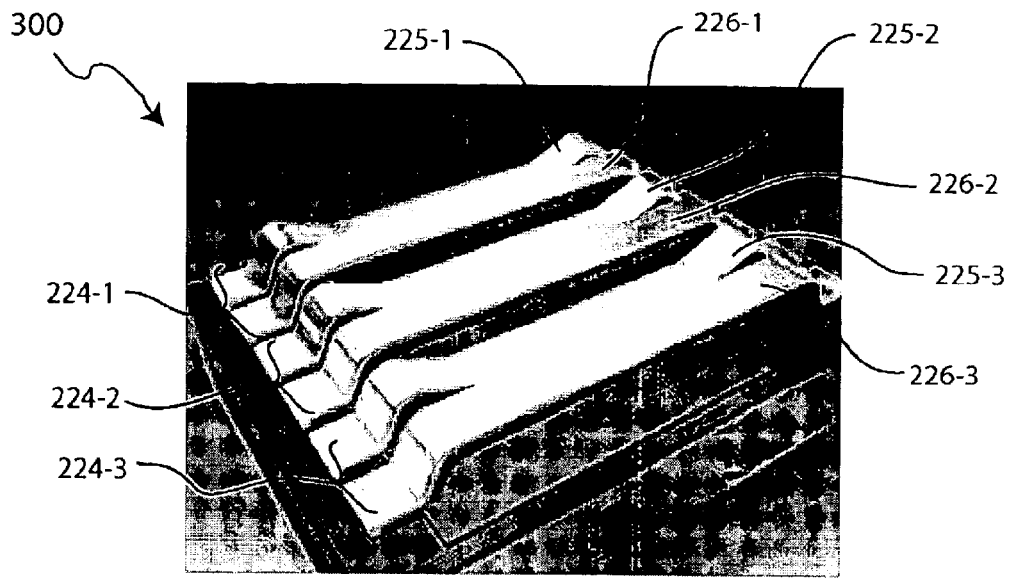
FIG. 3A shows a perspective view of a light modulator in accordance with an embodiment of the present invention.

Referring to FIG. 3A, there is shown a perspective view of a light modulator 300 in accordance with an embodiment of the present invention. Light modulator 300 comprises an array of ribbon pairs 224 (224-1, 224-2, 224-3). Each ribbon pair 224 comprises a fixed ribbon 226 (226-1, 226-2, 226-3) and a deflectable ribbon 225 (225-1, 225-2, 225-3). In the example of FIG. 3A, ribbon pair 224-1 comprises fixed ribbon 226-1 and deflectable ribbon 225-1, ribbon pair 224-2 comprises fixed ribbon 226-2 and deflectable ribbon 225-2, and so on. In accordance with an embodiment of the present invention, a ribbon may be a silicon nitride microstructure coated with a reflective surface of aluminum alloy. A ribbon may be about 400 Angstroms to about 1200 Angstroms thick, about 200 µm long, and about 4 µm wide. Ribbon pairs 224 may be fabricated using MEMS technology.

Ribbon pairs 224 are suspended above an air gap. Underneath ribbon pairs 224 is a common bottom electrode (see bottom electrode 407 shown in FIG. 4), which may be set at ground potential. Applying a bias voltage on a ribbon pair 224 results in an electrostatic force that attracts a deflectable ribbon 225 towards the bottom electrode, thus deflecting the deflectable ribbon 225. A fixed ribbon 226 stays relatively taut and un-deformed during this time. Removing the bias voltage causes the deflectable ribbon 225 to spring back to its original un-deformed shape. The amount by which a ribbon 225 is deflected towards the bottom electrode depends on the applied bias voltage.

Figure 3B:
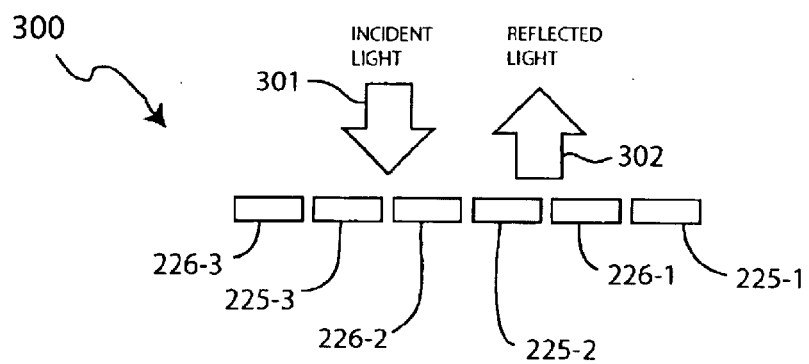
FIG. 3B schematically shows the light modulator of FIG. 3A in a specular state.

FIG. 3B schematically shows light modulator 300 in a specular state, which is a state where no bias voltage is applied on ribbon pairs 224. In the specular state, deflectable ribbons 225 and fixed ribbons 226 are un-deflected, thereby causing an incident light 301 to reflect off the surface of the ribbons as a reflected light 302.

Figure 3C:
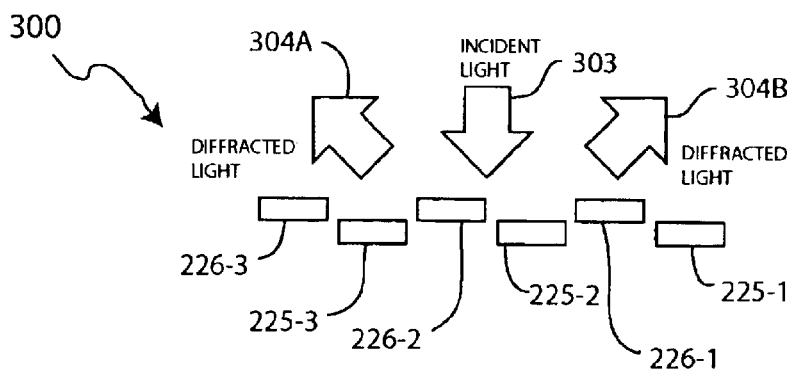
FIG. 3C schematically shows the light modulator of FIG. 3A in a diffraction state.

FIG. 3C schematically shows light modulator 300 in a diffraction state, which is a state where a bias voltage is applied on ribbon pairs 224. In the diffraction state, deflectable ribbons 225 are deflected while fixed ribbons 226 remain relatively un-deflected. As shown in FIG. 3C, this causes portions of an incident light 303 to diffract off the surface of the ribbons as diffracted light 304 (i.e., 304A, 304B). Thus, by controlling the bias voltage on ribbon pairs 224, the amount of light being diffracted or reflected may be controlled. Note that in a typical application, incident light impinges on a portion, rather than the entirety, of the reflective surface of light modulator 300.

Ribbon light modulators and their applications to video display systems are also discussed in the following disclosures: "The Grating Light Valve: Revolutionizing Display Technology," by D. M. Bloom, Projection Displays III Symposium, SPIE Proceedings, Volume 3013, San Jose, Calif., February 1997; "Grating Light Valve Technology: Update and Novel Applications," by D. T. Amm and R. W. Corrigan of Silicon Light Machines in Sunnyvale, Calif., a paper presented at the Society for Information Display Symposium, May 19, 1998, Anaheim, Calif.; "Optical Performance of the Grating Light Valve Technology," David T. Amm and Robert W. Corrigan of Silicon Light Machines, a paper presented at Photonics West-Electronics Imaging, 1999; "Calibration of a Scanned Linear Grating Light Valve Projection System," R. W. Corrigan, D. T. Amm, P. A. Alioshin, B. Staker, D. A. LeHoty, K. P. Gross, and B. R. Lang, a paper presented at the Society for Information Display Symposium, May 18, 1999, San Jose, Calif.; and "An Alternative Architecture for High Performance Display," R. W. Corrigan, B. R. Lang, D. A. LeHoty, and P. A. Alioshin of Silicon Light Machines, a paper presented at the 141st SMPTE Technical Conference and Exhibition, Nov. 20, 1999, New York, N.Y.

Video applications require beams with relatively high power densities. For example, compared to printing applications that use a laser beam having a power density of about 2 kW/cm$^2$, some video applications require beam power densities greater than about 3 kW/cm$^2$ (e.g., about 5 kW/cm$^2$). The higher the beam power density, the greater the thermal gradient on the plane of incidence. In addition, thermal gradient related issues become significant when a beam impinges on a portion of the plane of incidence, rather than the entirety of the plane.

As applied to ribbon light modulators, a high power beam impinging on a middle portion of a reflective surface of a ribbon can result in a high thermal gradient between the middle portion and the end portion of the ribbon. Depending on the power density of the beam, a ribbon that is 200 µm long may have a middle portion at about 200° C. to 300° C., and an end portion at about 60° C. With a reflective surface comprising aluminum, this relatively large thermal gradient may lead to thermally induced diffusion of aluminum atoms from the middle portion to the end portion of the ribbon. The thermally induced diffusion of atoms due to thermal gradient is also known as the "Soret effect". Large thermal gradients may damage a ribbon by inducing cracking and other structural damage.

Without being limited by theory, grain boundaries are high diffusion paths that facilitate diffusion of aluminum atoms. The inventors believe that having precipitates along grain boundaries may block aluminum atoms moving along these high diffusion paths. Thus, in accordance with an embodiment of the present invention, a reflective surface employed in a relatively high power application, such as video, comprises aluminum alloy rather than pure aluminum. The aluminum alloy may comprise copper and aluminum. As an example, the aluminum alloy may comprise 99.5% aluminum and 0.5% copper. The copper serves as a precipitate for blocking the diffusion of aluminum atoms along grain boundaries. Up to a certain concentration, the higher the percentage of copper, the slower the diffusion of aluminum atoms. Preferably, the percentage of copper and the other precipitates (i.e., titanium, hafnium) discussed below is or under about 2%. As an example, the percentage of copper (or titanium or hafnium) in the aluminum alloy may be between about 0.5% to 2%.

Although copper may be effectively used to retard diffusion of aluminum atoms, copper is not specially suited for dry etching. Thus, structures comprising aluminum and copper are typically wet-etched. To allow for the use of a dry-etch process, titanium may be employed instead of copper. That is, a reflective surface may comprise an aluminum alloy of aluminum and titanium ($Al—Ti_x$). Just like copper, precipitates of titanium block high diffusion paths taken by migrating aluminum atoms. In addition, titanium is advantageously suitable for dry-etching. Another precipitate that may be employed include those of hafnium ($Al—Hf_x$).

Figure 4:
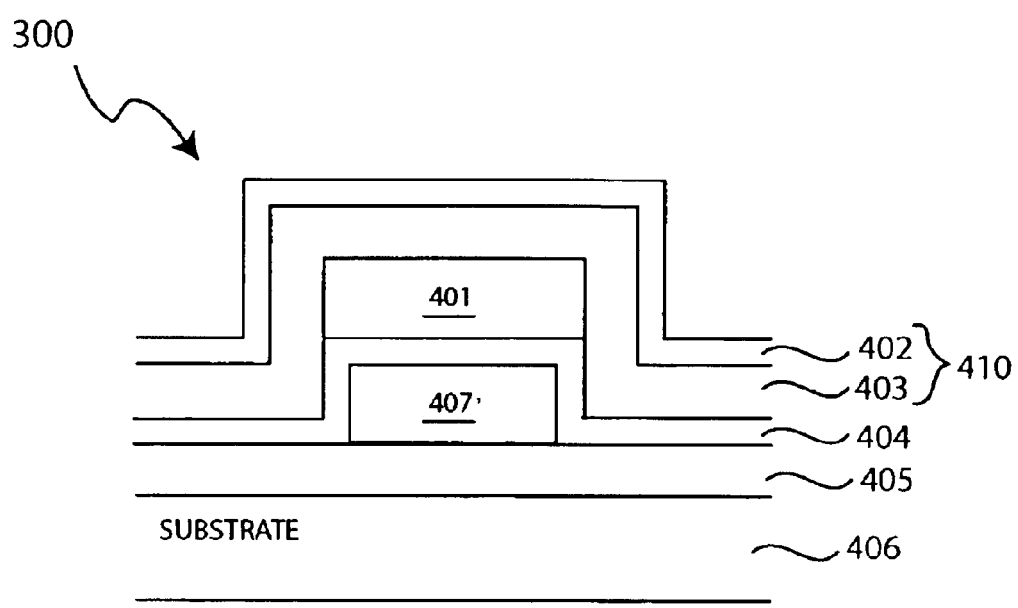
FIG. 4 schematically shows a sectional view of a light modulator in accordance with an embodiment of the present invention.

FIG. 4 schematically shows a sectional view of a light modulator 300 in accordance with an embodiment of the present invention. Note that FIG. 4 is not drawn to scale. Also, although a light modulator 300 typically includes more than one ribbon, only one ribbon 410 is shown in FIG. 4 for clarity of illustration. Ribbon 410 may be a fixed ribbon 226 or a deflectable ribbon 225.

Light modulator 300 includes ribbon 410 comprising a resilient structure 403 and a reflective metal layer 402. Metal layer 402 provides a reflective surface for incident light. In accordance with an embodiment of the present invention, metal layer 402 may comprise an aluminum alloy, while resilient structure 403 may be a layer of silicon nitride ($Si_3N_4$). Metal layer 402 may comprise an aluminum alloy of copper ($Al—Cu_x$), an aluminum alloy of titanium ($Al—Ti_x$), or aluminum alloy of hafnium ($Al—Hf_x$) to make it specially suitable for high power applications as discussed above. Aluminum alloy is commercially available from various vendors. An aluminum alloy comprising aluminum and copper may be deposited on resilient structure 403 by physical vapor deposition, for example.

An air gap 401 separates ribbon 410 from a bottom electrode 407. Bottom electrode 407 may comprise polysilicon. The polysilicon may be heavily doped with an n-type dopant (e.g., phosphorous) so that it may be used as an electrode. Air gap 401 is typically formed by depositing amorphous silicon in the space occupied by air gap 401, and then isotropically etching the amorphous silicon with xenon difluoride ($XeF_2$). The amorphous silicon is deposited over bottom electrode 407 using a low pressure chemical vapor deposition process. To protect a polysilicon bottom electrode 407 during the etching of the amorphous silicon, a thin silicon dioxide ($SiO_2$) layer 404 may be deposited over bottom electrode 407. That is, silicon dioxide layer 404 serves as an etch stop for the amorphous silicon etch. As shown in FIG. 4, bottom electrode 407 may be formed over an isolation layer 405 (e.g., silicon dioxide), which in turn is over a substrate 406 (e.g., silicon substrate).

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of displaying a video image, the method comprising:

impinging a beam on a portion of a reflective surface of a light modulator, the beam having a wavelength suitable for displaying a video image, and wherein the reflective surface comprises an aluminum alloy, the aluminum alloy comprising aluminum and copper.

2. The method of claim 1 wherein the copper is greater than about 0.5% of the aluminum alloy.

3. The method of claim 1 wherein the wavelength is between about 400 nm and about 700 nm.

4. The method of claim 1 wherein the beam comprises a laser beam having a power density greater than about 3 $kW/cm^2$.

5. The method of claim 1 wherein the light modulator comprises a plurality of deflectable ribbons.

6. A system for displaying a video image, the system comprising:

an array of ribbon light modulators having a reflective surface configured to reflect or diffract a beam to display a video image, and wherein the reflective surface comprises an aluminum alloy, the aluminum alloy comprising aluminum and copper.

7. The system of claim 6 wherein the copper is greater than about 0.5% of the aluminum alloy.

8. The system of claim 6 wherein the beam has a wavelength between about 400 nm and about 700 nm.

9. The system of claim 6 wherein the beam comprises a laser beam having a power density greater than about 3 $kW/cm^2$.

10. A method of displaying a video image, the method comprising:

impinging a first beam on a portion of a reflective surface of a light modulator, the reflective surface comprising an aluminum alloy, the aluminum alloy comprising aluminum and copper; and projecting the first beam on a screen to display a first color of a multi-color video image.

11. The method of claim 10 further comprising:

impinging a second beam on the reflective surface; and projecting the second beam on the screen to display a second color of the video image.

12. The method of claim 11 wherein the first beam has a wavelength that results in the first color being red.

13. The method of claim 11 wherein the first beam has a wavelength that results in the first color being green.

14. The method of claim 11 wherein the first beam has a wavelength that results in the first color being blue.

15. The method of claim 11 wherein the copper comprises greater than about 0.5% of the aluminum alloy.

16. A method of displaying a video image, the method comprising:

impinging a beam on a portion of a reflective surface of a light modulator, the beam having a wavelength suitable for displaying a video image, and wherein the reflective surface comprises an aluminum alloy, the aluminum alloy comprising aluminum and titanium.

17. The method of claim 16 wherein the wavelength is between about 400 nm and about 700 nm.

18. The method of claim 16 wherein the beam comprises a laser beam having a power density greater than about 3 kW/cm$^2$.

19. The method of claim 16 wherein the light modulator comprises a plurality of deflectable ribbons.

20. A method of displaying a video image, the method comprising:

impinging a beam on a portion of a reflective surface of a light modulator, the beam having a wavelength suitable for displaying a video image, and wherein the reflective surface comprises an aluminum alloy, the aluminum alloy comprising aluminum and hafnium.

21. The method of claim 20 wherein the wavelength is between about 400 nm and about 700 nm.

22. The method of claim 20 wherein the beam comprises a laser beam having a power density greater than about 3 kW/cm$^2$.

23. The method of claim 20 wherein the light modulator comprises a plurality of deflectable ribbons.

24. A system for displaying a video image, the system comprising:

an array of ribbon light modulators having a reflective surface configured to reflect or diffract a beam to display a video image, and wherein the reflective surface comprises an aluminum alloy, the aluminum alloy comprising aluminum and titanium.

25. The system of claim 24 wherein the beam has a wavelength between about 400 nm and about 700 nm.

26. The system of claim 24 wherein the beam comprises a laser beam having a power density greater than about 3 kW/cm$^2$.

27. A system for displaying a video image, the system comprising:

an array of ribbon light modulators having a reflective surface configured to reflect or diffract a beam to display a video image, and wherein the reflective surface comprises an aluminum alloy, the aluminum alloy comprising aluminum and hafnium.

28. The system of claim 27 wherein the beam has a wavelength between about 400 nm and about 700 nm.

29. The system of claim 27 wherein the beam comprises a laser beam having a power density greater than about 3 kW/cm$^2$.

30. A method of displaying a video image, the method comprising:

impinging a first beam on a portion of a reflective surface of a light modulator, the reflective surface comprising an aluminum alloy, the aluminum alloy comprising aluminum and titanium;

projecting the first beam on a screen to display a first color of a multi-color video image;

impinging a second beam on the reflective surface; and projecting the second beam on the screen to display a second color of the video image.

31. The method of claim 30 wherein the first beam has a wavelength that results in the first color being red.

32. The method of claim 30 wherein the first beam has a wavelength that results in the first color being green.

33. The method of claim 30 wherein the first beam has a wavelength that results in the first color being blue.

34. A method of displaying a video image, the method comprising:

impinging a first beam on a portion of a reflective surface of a light modulator, the reflective surface comprising an aluminum alloy, the aluminum alloy comprising aluminum and hafnium;

projecting the first beam on a screen to display a first color of a multi-color video image;

impinging a second beam on the reflective surface; and projecting the second beam on the screen to display a second color of the video image.

35. The method of claim 34 wherein the first beam has a wavelength that results in the first color being red.

36. The method of claim 34 wherein the first beam has a wavelength that results in the first color being green.

37. The method of claim 34 wherein the first beam has a wavelength that results in the first color being blue.

* * * * *